(12) United States Patent
Daniel-Ivad

(10) Patent No.: US 7,754,386 B2
(45) Date of Patent: Jul. 13, 2010

(54) RECHARGEABLE ALKALINE MANGANESE CELL HAVING REDUCED CAPACITY FADE AND IMPROVED CYCLE LIFE

(75) Inventor: Josef Daniel-Ivad, Newmarket (CA)

(73) Assignee: Pure Energy Visions Corporation (CA)

( * ) Notice: Subject to any disclaimer, the term of this patent is extended or adjusted under 35 U.S.C. 154(b) by 379 days.

(21) Appl. No.: 11/287,263

(22) Filed: Nov. 28, 2005

(65) Prior Publication Data

US 2007/0122704 A1  May 31, 2007

(51) Int. Cl.
*H01M 4/50* (2010.01)
(52) U.S. Cl. .................. 429/231.95; 429/224; 429/232; 252/182.1
(58) Field of Classification Search ............ 429/231.95, 429/224, 232; 252/182.1
See application file for complete search history.

(56) References Cited

U.S. PATENT DOCUMENTS

| | | | |
|---|---|---|---|
| 5,272,020 A | 12/1993 | Flack | |
| 5,281,497 A | 1/1994 | Kordesch et al. | |
| 5,300,371 A | 4/1994 | Tomantschger et al. | |
| 5,424,145 A * | 6/1995 | Tomantschger et al. | ....... 429/57 |
| 5,626,988 A | 5/1997 | Daniel-Ivad et al. | |
| 6,099,987 A | 8/2000 | Daniel-Ivad et al. | |
| 6,361,899 B1 | 3/2002 | Daniel-Ivad et al. | |
| 7,008,723 B2 | 3/2006 | Daniel-Ivad et al. | |
| 7,169,508 B2 | 1/2007 | Daniel-Ivad et al. | |
| 2005/0164076 A1 | 7/2005 | Daniel-Ivad | |
| 2006/0082345 A1 | 4/2006 | Daniel-Ivad et al. | |

FOREIGN PATENT DOCUMENTS

| | | | |
|---|---|---|---|
| CA | 2389907 A1 | | 12/2003 |
| DE | 3337568 | | 4/1985 |
| EP | 0789410 A1 | | 8/1997 |
| JP | 56103864 | * | 8/1981 |
| JP | 63-4555 A | | 1/1988 |
| JP | 411329419 A | * | 11/1999 |
| WO | WO 93/12551 | | 6/1993 |

OTHER PUBLICATIONS

Feb. 19, 2009 Supplementary European Search Report for European Patent Application No. 06 81 7661.
Aug. 31, 2009 Office Action for European Patent Application No. 06 817 661.9.

* cited by examiner

*Primary Examiner*—Jane Rhee
(74) *Attorney, Agent, or Firm*—Brunet & Co. Ltd

(57) ABSTRACT

Rechargeable galvanic cells are disclosed which comprise a manganese dioxide cathode, a zinc anode and a potassium hydroxide electrolyte wherein the cathode includes additive compounds to increase the cycle life and cumulative discharge capacity of the cell. The additives comprise at least a strontium compound and optionally a barium and/or calcium compound. Cells including the additive(s) desirably have an individual discharge capacity after 50 deep discharge-charge cycles of at least $0.100\ Ah/gMnO_2$.

10 Claims, 1 Drawing Sheet

RECHARGEABLE ALKALINE MANGANESE CELL HAVING REDUCED CAPACITY FADE AND IMPROVED CYCLE LIFE

FIELD OF THE INVENTION

The invention relates to rechargeable alkaline batteries having a manganese dioxide ($MnO_2$) positive electrode material, a potassium hydroxide (KOH) electrolyte and zinc (Zn) as the negative electrode material. Specifically, the invention relates to cathode formulations of such batteries that comprise additives for improved cycle life and cumulative performance.

BACKGROUND OF THE INVENTION

Primary and secondary (rechargeable) manganese dioxide-based alkaline cells are well known and include a positive electrode having manganese dioxide as an active material, a negative electrode utilizing zinc as the active material, an aqueous solution of potassium hydroxide as electrolyte, and a separator between the positive and negative electrode.

To overcome recharge problems of the $MnO_2$ in the positive electrode, cells were developed in which the discharge capacity of the cell was limited by imposing a zinc electrode limitation. Due to problems with the rechargeability of the $MnO_2$ cathode, these cells experience capacity fading on deep discharge, which results in a successive reduction of the available discharge time following each discharge-charge cycle. End-users of the batteries perceive this as diminishing usefulness and may be inclined to prematurely dispose of the battery. The occurrence of capacity fade is evidence that the manganese dioxide electrode is not fully reversible. Numerous approaches have been taken to reduce the capacity fade experienced such as employing various additives to the positive and the negative electrodes.

In this regard, reference is made to Kordesch et al in German patent number 3,337,568 issued Apr. 25, 1984. This patent describes a method for producing electrolytic manganese dioxide that is doped with titanium. Such a titanium-doped $MnO_2$ is particularly suitable for use in rechargeable manganese dioxide/zinc cells.

Taucher et al, in WO 93/12551 filed Dec. 21, 1992, discloses improvements to primary and rechargeable alkaline manganese dioxide cells, containing barium compounds in an amount of 3-25% of the $MnO_2$ positive electrode material.

Tomantschger et al, in U.S. Pat. No. 5,300,371, issued Apr. 5, 1994, teaches a rechargeable alkaline manganese dioxide cell with improved performance and cycle life containing organic binders, and silver and barium compounds added to the $MnO_2$ positive electrode.

Daniel-Ivad, et al., in U.S. Pat. No. 6,361,899 discloses a range of additives to the positive electrode formulation comprising a first additive selected from the group consisting of barium and strontium compounds; and, a second additive selected from the group consisting of titanium, lanthanum, cerium, yttrium zinc, calcium, tin and magnesium compounds.

Daniel-Ivad, in U.S. Pat. Appl. No. 2005/0164076 teaches the use of hydrophobic additives for more efficient processing of cathode pellets comprising hygroscopic additives such as oxides, hydroxides, or hydrates of barium or strontium. These hygroscopic additives desirably increase the performance of the cell, as indicated by increases in the cumulative discharge capacity and cycle life of the cell.

While the foregoing references disclose a number of approaches for improved performance and cycle life, rechargeable alkaline cells still show capacity fade and diminishing useful capacity as the number of cycles increase. Particularly at moderate to low rates of discharge at 10-15 $mA/cm^2$, the capacity fade is still very pronounced.

Accordingly, there is still a need for an improved rechargeable alkaline battery cathode composition that results in increased overall battery performance and cycle life.

SUMMARY OF THE INVENTION

According to an aspect of the present invention, there is provided a rechargeable electrochemical cell comprising a manganese dioxide cathode, a separator, an anode and an aqueous alkaline electrolyte, the cathode comprising a strontium compound in an amount of from 4.50 to 16.10% by weight of the cathode, the cell having an individual discharge capacity after 50 deep discharge-charge cycles of at least 0.100 $Ah/gMnO_2$.

According to another aspect of the invention, there is provided a rechargeable electrochemical cell comprising a manganese dioxide cathode, a separator, an anode and an aqueous alkaline electrolyte, the cathode comprising a strontium compound in an amount of from 4.50 to 16.10% by weight of the cathode and a barium compound in a non-zero amount less than or equal to 1.00% by weight of the cathode.

According to yet another aspect of the invention, there is provided a method of increasing the cumulative discharge capacity of an electrochemical cell having a manganese dioxide cathode, a separator, an anode and an aqueous alkaline electrolyte, the method comprising adding a strontium compound in an amount of from 4.50 to 16.10% by weight of the cathode, the strontium for increasing an individual discharge capacity of the cell after 50 deep discharge-charge cycles.

The present invention provides a rechargeable alkaline manganese dioxide-zinc cell having at least a strontium compound in the positive electrode. The cells of the present invention advantageously exhibit a high discharge capacity on the initial discharge and a long cycle life (increased number of discharge/charge cycles) with reduced capacity fade after successive discharge/charge cycles. This is perceived by end-users as an increase in usable discharge time of the battery. Batteries according to the present invention desirably and advantageously have an individual discharge capacity after 50 deep discharge-charge cycles of at least 0.100 $Ah/gMnO_2$.

In one embodiment, the present invention provides a cell comprising a manganese dioxide cathode including a strontium-based compound and optionally a barium-based compound. Such a barium and/or strontium compound may be in the form of oxides or hydroxides and/or hydrates thereof. The effect of the barium and/or strontium based compound is enhanced by further addition of a calcium compound comprising oxides, hydroxides or fatty acids of calcium, such as calcium stearate. The calcium compound may be provided alone or in conjunction with a compound to enhance processing of the catalyst, for example a polyethylene compound such as Coathylene™.

The compounds may be present in a total amount of from about 4.5% to about 20.0% by weight of the cathode, preferably from about 5.5% to about 17.5% by weight of the cathode, more preferably from about 7.15% to about 17.5% by weight of the cathode, still more preferably from about 7.15% to about 9.75% by weight of the cathode.

The strontium compound may be present in an amount of from 4.50% to about 16.10% by weight of the cathode, preferably from about 5.0% to about 13.60% by weight of the cathode, more preferably from about 5.75% to about 11.85% by weight of the cathode, still more preferably from about 5.75% to about 8.35% by weight of the cathode, yet more preferably from about 5.75% to about 6.75% by weight of the cathode. The strontium compound is preferably present as strontium oxide or strontium hydroxide, including hydrates of strontium oxide or strontium hydroxide.

The barium compound may be present in a non-zero amount of less than 1.0% by weight of the cathode. The barium compound may be present in an amount of from about 0.1% to about 1.0% by weight of the cathode. The barium compound may be present in an amount of from about 0.5% to about 1.0% by weight of the cathode. The barium compound may be present in an amount of from about 0.75% to about 1.0% by weight of the cathode. The barium compound is preferably present in an amount of about 1.0% by weight of the cathode. When present, the barium compound is preferably provided as barium oxide or barium hydroxide, including hydrates of barium oxide or barium hydroxide.

When present, the calcium compound may be provided as calcium oxide, calcium hydroxide or a fatty acid of calcium. The calcium compound is preferably in a non-zero amount of less than 5% by weight of the cathode, more preferably from about 0.1% to about 1.25% by weight of the cathode, still more preferably from about 0.25% to about 1.25% by weight of the cathode, yet more preferably from about 0.25% to about 0.4% by weight of the cathode. In one embodiment, the calcium compound is present as calcium oxide in an amount of from 0.1% to about 0.5% by weight of the cathode, preferably from about 0.2% to about 0.3% by weight of the cathode, more preferably about 0.25% by weight of the cathode. In this embodiment, the calcium oxide is preferably accompanied by a compound for enhancing the processing characteristics of the cathode, which is more preferably a polyethylene compound that is most preferably Coathylene™. This compound for enhancing the processing characteristics of the cathode is preferably present in an amount of from about 0.1% to about 0.2% by weight of the cathode, more preferably in an amount of about 0.15% by weight of the cathode. In another embodiment, the calcium compound is present as calcium stearate in an amount of from 0.1% to about 0.75% by weight of the cathode, preferably from about 0.25% to about 0.5% by weight of the cathode, more preferably about 0.4% by weight of the cathode. In this embodiment, the calcium compound is preferably not accompanied by a polyethylene compound for enhancing processability of the cathode, as the calcium stearate itself may provide this function.

The manganese dioxide cathode of the cell may comprise from 0.1% to 5% of a hydrogen recombination catalyst. Such catalysts may comprise silver, silver oxides, or other known compounds of silver, preferably group I compounds of silver. Alternatively, the hydrogen recombination catalyst can include metal hydrides such as $Ti_2Ni$.

The individual discharge capacity of the cell after 50 deep discharge-charge cycles may be at least 0.100 Ah/$gMnO_2$, preferably at least 0.104 Ah/$gMnO_2$, more preferably at least 0.114 Ah/$gMnO_2$, still more preferably at least 0.121 Ah/$gMnO_2$. The cumulative discharge capacity of the cell after 50 deep discharge/charge cycles may be at least 41.00 Ah, preferably at least 49.00 Ah, more preferably at least 52.00 Ah, still more preferably at least 53.00 Ah.

Appropriate cell designs, providing negative and positive electrodes respectively connected to negative and positive terminals for the cell, and separated by an appropriate separator, may be provided in bobbin cells, spirally wound cells, flat plate cells, and button or coin cells.

BRIEF DESCRIPTION OF THE DRAWINGS

These and other features of the invention will become more apparent in the following detailed description wherein reference is made to the appended FIG. 1, which is a cross-sectional view of a cell according to one embodiment of the invention.

DESCRIPTION OF THE PREFERRED EMBODIMENTS

Figure 1:
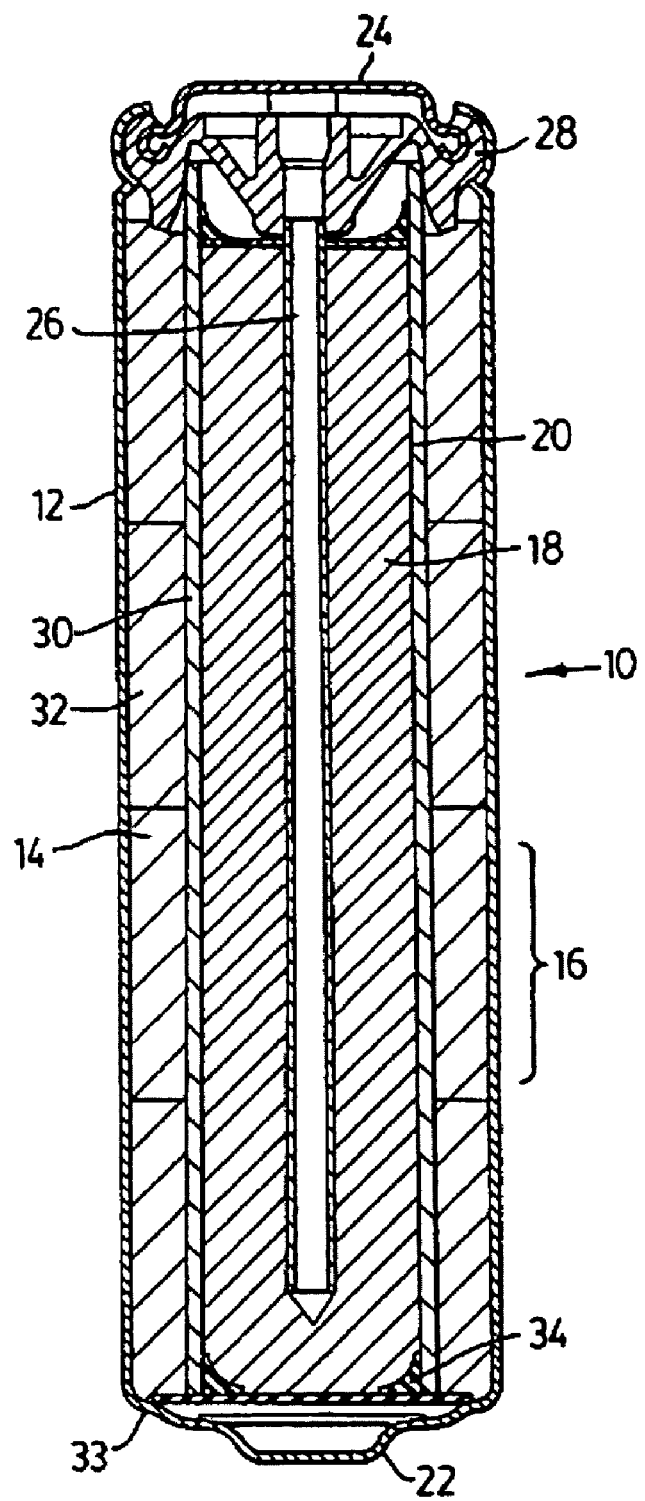

FIG. 1 shows a cross sectional elevation view of an alkaline rechargeable cell 10. The cell comprises the following main units: a steel can 12 defining a cylindrical inner space, a cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between and in the anode and the cathode is provided by the presence of potassium hydroxide electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector 26 (sometimes known in the art as a "nail" attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

A separator 20 is placed between the positive and negative electrodes. The separator 20 mechanically separates the anode from the cathode and serves as an electrolyte reservoir. The separator 20 is generally a complex flexible structure that is impermeable to zinc dendrites, but is permeable to ions and may be permeable to the passage of gases such as hydrogen or oxygen that are produced within the cell on overcharge, standby, or overdischarge conditions. The separator 20 comprises two laminated layers; an inner absorber layer 30 made of a fibrous sheet material wettable by the electrolyte, and an outer ion permeable layer 32 which is typically a membrane that is impermeable to dendrites and small particles. The absorber layer 30 may be made from, for example, cellulose, Rayon™, polyamide, polypropylene or polyvinylalcohol fibers. A preferred material for the absorber layer 30 is a non-woven polyamide such as Freudenberg grade FS2213. The ion permeable layer 32 made from, for example, cellulose, Cellophane™, radiation grafted polyethylene, polypropylene, or the like. The ion permeable layer 32 is preferably a relatively thin Cellophane™ membrane.

The sealing of the bottom part of the cell is accomplished using an insulator washer 33, as shown in FIG. 1, which is placed in abutment with the bottom portion of the can 12 prior to the insertion of the cathode pellets 16. The laminated separator 20 is inserted thereafter so that its bottom edge abuts the insulator washer 33. The contact zone between the bottom of the separator 20 and the washer 33 is sealed by the application of a controlled amount of a sealant with thermoplastic properties. Suitable sealants may include epoxies, hot melt adhesives, asphalt, or similar materials. The sealant is applied using an appropriate heated tool which is inserted deeply within the cylindrical cavity of the cathode and dispenses a predetermined amount of sealant to the contact zone. After solidifying, the sealant usually has a concave profile with small height and width as shown at 34 in FIG. 1.

It will be appreciated that the exact configuration of the separator 20 and its bottom seal is not critical to the present invention. Other examples of sealing materials and methods are provided in U.S. Pat. No. 5,272,020, which is incorporated herein by reference.

Suitable active materials in cells utilizing manganese oxides as the cathode material comprise electrolytically or chemically synthesized manganese dioxide containing typically over 90% of four valent manganese and minor amounts of lower valance oxides. The manganese dioxide powder, along with any additives, can be blended together to form the cathode material in a process as described in U.S. Pat. No. 5,300,371, which is incorporated herein by reference. Depending on the nature of the cell, the positive electrode may be molded into pellets and inserted into the can followed optionally by recompaction. Alternatively, the positive electrode may be extruded directly into the can, or it may be rolled or cast as a flat positive electrode for use in flat plate cells and button or coin cells.

The negative zinc electrode comprises powdered metallic zinc or zinc alloys and optionally zinc oxide together with a suitable gelling agent such as carboxymethyl cellulose, polyacrylic acid, starches, and their derivatives. Zincate mobility within the cell may be reduced by the use of additives to the negative electrode mix such as 1% to 30% of compounds of magnesium, barium, and calcium, typically their oxides, or their hydroxides, or mixtures thereof, as described in U.S. Pat. No. 5,300,371.

The electrolyte is an aqueous alkaline solution of usually 4N to 12N potassium hydroxide. The electrolyte may contain additives such as dissolved zinc oxide. ZnO, so as to reduce the gassing of the active zinc within the negative electrode, and so as to permit overcharge of the cell without damaging same. Also, ZnO may be optionally included in the cell as a reserve mass.

As discussed above, it has been found that various additives to the cathode material reduce capacity fade in rechargeable cells and increase cycle life and thereby increase cumulative discharge capacity. The subject additives consist of barium, strontium and calcium compounds in the range of from 0.1% to 20.0% by weight of the cathode. The barium, strontium and calcium compounds are present in the cell preferably in forms such as hydroxides, oxides and/or hydrates thereof.

The amount of the various additive compounds will vary depending on the size of the cell. For example, a "D" size cell with thicker electrode layer will require more additive addition than an "M" size cell. As a general rule, the additive amounts should be increased as a function of percentage increase of the cathode electrode layer thickness. For example, a 4 mm cathode electrode thickness will require double the additive amount of a 2 mm cathode electrode thickness.

Cells according to the present invention may include a number of other additives for purposes of enhancing the conductivity and the structural integrity of the manganese dioxide positive electrode, or for enhancing hydrogen recombination at the electrode. Suitable examples of these additives are provided in U.S. Pat. Appl. No. 2005/0164076, which is incorporated herein by reference, and in U.S. Pat. No. 5,300,371. For example, the manganese dioxide electrode may include at least one additive comprising graphite, carbon black, inorganic binders, organic binders (eg: Coathylene™) and/or at least one additive comprising silver (I) oxide.

The following examples will assist those skilled in the art to better understand the invention and its principles and advantages. It is intended that these examples be illustrative of the invention and not limit the scope thereof.

Example 1

AA-size rechargeable alkaline cells were prepared as described in U.S. Pat. No. 5,300,371 and the above description, except that various additives were combined with the positive electrode material. In this example, four prior art cathode formulations are compared to five comparative test groups according to the present invention.

The additives for the prior art test cells comprised $BaSO_4$ and a $BaSO_4$/CaO combinations as indicated in Table 1a below. Prior Art 1 was selected as the typical formulation for rechargeable alkaline cells most commonly sold on the market today and is based on the Taucher et al. prior art WO 93/12551. The best overall AA formula, as shown in Table 3 of this patent, is 5% $BaSO_4$, which was chosen for Prior Art 1. Prior Art 2 & 3 examples are based on the Daniel-Ivad et al prior art U.S. Pat. No. 6,361,899, which teaches a two additive approach for better performance. The formulation of Prior Art 2 example was modeled from example 3 of the '899 patent using $BaSO_4$ as first additive and CaO as second additive. To express all formulation examples in a consistent fashion in this present specification, the expression 'wt % added to EMD' of example 3 in '899 patent was converted to 'wt % added to cathode'. To do this, one has to mathematically determine the EMD content of the formulation of the example 3. The determination of EMD content is known to persons skilled in the art and was calculated in example 3 at 79.5%. With this EMD content, the wt % added to cathode can be calculated as follows:

$$\text{wt \% added to cathode} = \text{wt \% added to EMD} * 0.795$$

Therefore, the wt % added to cathode in example 3 of the '899 patent was 5 wt % $BaSO_4$ and 1 wt % CaO. These additive levels were used for Prior Art 2. Prior Art 3 example uses a higher amount of $BaSO_4$ and lower amount of CaO to mimic the same total additive levels as tests #4, #5 and #9 of this invention. Prior Art 4 is again based on Taucher et al. WO 93/12551. The best 10-ohm results for the AA cell size were achieved with a 15% $BaSO_4$ addition over a 30 cycle test. Therefore, the 15% $BaSO_4$ level was chosen for Prior Art 4.

The comparative test groups comprised a mixture of Barium Hydrate ($Ba(OH)_2*8H_2O$), Strontium Hydrate ($Sr(OH)_2*8H_2O$), and Calcium Oxide (CaO) in the amounts shown in Table 1a below. The comparative test groups containing the barium or strontium hydrate additive, had also 0.15% Coathylene® HA1681 additive for improved cathode pellet pressing characteristic as described in U.S. Pat. Appl. No. 2005/0164076. In all cases the additives replaced part of the active electrolytic manganese dioxide (EMD) material in a way that the volume of the total cell materials was maintained at a constant level and the anode capacity was maintained at a constant level as well. As a result, the theoretical 'one-electron' cathode capacity (308 $mAh/gMnO_2$) is reduced with increasing additive content and the capacity balance of anode capacity to cathode capacity (balance=anode Ah/cathode Ah) increases accordingly as shown in Table 1a.

The various sets of test cells from each of the groups were cycle tested by continuously discharging the cell on a 10 ohm load resistor to a cutoff voltage of 0.9 Volts, followed by a 12 hour recharge to 1.75 Volts, which completes one full deep discharge/charge cycle. The 10 ohm load represents a medium discharge rate of 90-150 mA, or approximately 10-15 $mA/cm^2$, and is more prone to capacity fade in rechargeable alkaline cells. Note that this 12 hour 1.75V recharge regimen simulates about the performance that can be achieved with the new charge algorithm described in U.S. Pat. Appl. No. 2005/0164076. The test cells were tested over 50 such deep discharge/charge cycles.

Table 1a contains the additive composition of example 1 cathodes and Table 1b shows the average discharge capacity of the test cells on the 25$^{th}$ and 50$^{th}$ discharge as well as the cumulative capacity obtained in 25 and 50 cycles. The term cumulative capacity means the sum of all individual discharge capacities over the tested number of cycles. The given data represent the average of 4 cells per test in each group.

Test #5 cathode, which contained only a mix of strontium and barium compound, no calcium compound in the formulation, performed slightly lower than test #4 with calcium compound in the formulation, but performed better than test #1 with barium and calcium compound mix that had no stron- TABLE 1a Additive composition for cathodes in Example 1

| Group# | Cathode Ah | g MnO2 | Anode Ah | Balance | BaSO4 | B8W | S8W | CaO | CoA | CaSt | Total |
|---|---|---|---|---|---|---|---|---|---|---|---|
| PriorArt1 | 2.43 | 7.88 | 2.31 | 95% | 5.00% | 0% | 0% | 0% | 0% | 0% | 5.00% |
| PriorArt2 | 2.43 | 7.88 | 2.31 | 95% | 5.00% | 0% | 0% | 1.00% | 0% | 0% | 6.00% |
| PriorArt3 | 2.36 | 7.66 | 2.31 | 98% | 7.15% | 0% | 0% | 0.25% | 0% | 0% | 7.40% |
| PriorArt4 | 2.19 | 7.10 | 2.31 | 106% | 15.00% | 0% | 0% | 0% | 0% | 0% | 15.00% |
| Test#1 | 2.33 | 7.58 | 2.31 | 99% | 0% | 6.75% | 0% | 0.25% | 0.15% | 0% | 7.15% |
| Test#2 | 2.34 | 7.58 | 2.31 | 99% | 0% | 1.00% | 5.75% | 0.25% | 0.15% | 0% | 7.15% |
| Test#3 | 2.29 | 7.42 | 2.31 | 101% | 0% | 0% | 7.15% | 0% | 0.15% | 0% | 7.30% |
| Test#4 | 2.29 | 7.44 | 2.31 | 101% | 0% | 1.00% | 6.00% | 0.25% | 0.15% | 0% | 7.40% |
| Test#5 | 2.29 | 7.42 | 2.31 | 101% | 0% | 1.00% | 6.25% | 0% | 0.15% | 0% | 7.40% |

Legend:
BaSO4 = barium sulfate;
B8W = barium hydrate (Ba(OH2)*8H2O);
S8W = strontium hydrate (Sr(OH2)*8H2O);
CaO = calcium oxide;
CoA = Coathylene ® HA1681;
CaSt = calcium stearate (Ca[CH3(CH2)16CO2]2

TABLE 1b

Cycle performance over 50 deep discharge/charge cycles

| Grp# | Capacities in Ah | | | | | % Change vs. PriorArt1 | | | | |
|---|---|---|---|---|---|---|---|---|---|---|
| | cyc1 | cyc25 | cyc25cum | cyc50 | cyc50cum | cyc1 | cyc25 | cyc25cum | cyc50 | cyc50cum |
| PriorArt1 | 1.76 | 0.63 | 23.71 | 0.42 | 35.62 | 0% | 0% | 0% | 0% | 0% |
| PriorArt2 | 1.65 | 0.68 | 22.43 | 0.61 | 38.18 | −7% | 8% | −5% | 44% | 7% |
| PriorArt3 | 1.72 | 0.76 | 25.01 | 0.47 | 40.36 | −3% | 22% | 5% | 10% | 13% |
| PriorArt4 | 1.62 | 0.67 | 23.39 | 0.60 | 38.90 | −8% | 8% | −1% | 43% | 9% |
| Test#1 | 1.78 | 0.86 | 30.34 | 0.75 | 49.62 | 1% | 38% | 28% | 77% | 39% |
| Test#2 | 1.76 | 1.05 | 30.05 | 0.89 | 53.63 | 0% | 68% | 27% | 110% | 51% |
| Test#3 | 1.71 | 1.05 | 30.60 | 0.73 | 52.27 | −3% | 67% | 29% | 72% | 47% |
| Test#4 | 1.68 | 1.00 | 30.78 | 0.91 | 53.71 | −5% | 59% | 30% | 115% | 51% |
| Test#5 | 1.70 | 1.04 | 29.87 | 0.85 | 53.50 | −3% | 67% | 26% | 101% | 50% |

Legend:
cyc1 = Cycle1;
cyc25 = Cycle25;
cyc50 = Cycle50;
cyc25cum = 25 CyclesCumulative;
cyc50cum = 50 CyclesCumulative As can be seen from tables 1a and 1b, the cells of comparative test #1-5 outperformed the cells made according to the prior art by a significant margin. Individual cycle 25 discharge capacity was up to 68% better than Prior Art 1 control and 46% better than best prior art. Cumulative over 25 cycles, total service capacity was up to 30% better than Prior Art 1 control and 25% better than best prior art. Individual cycle 50 discharge capacity was up to 115% better than Prior Art 1 control and 71% better than best prior art. Cumulative over 50 cycles, total service capacity was up to 51% better than Prior Art 1 control and 38% better than best prior art.

Test #3 cathode, which contained only strontium compounds (no barium or calcium compounds in the formulation) performed much improved over prior art groups #2 and #3 as well, despite the teachings of U.S. Pat. No. 6,361,899, which requires the use of a second additive selected from the group consisting of titanium, lanthanum, cerium, yttrium zinc, calcium, tin and magnesium compounds for improved performance.

tium compound at all. Test #2 cathode, which contained a mix of barium, strontium and calcium compound, showed better performance than test #1 with barium and calcium compound only. Hence, the presence of strontium is more important for better performance than barium or calcium compounds or a mixture thereof.

Example 2

AA-size rechargeable alkaline cells were prepared and tested similar to example 1 except that the total additive range was increased to 7.9% and 9.75% as shown in Table 2a.

Table 2b shows the average discharge capacity of the test cells on the 25$^{th}$ and 50$^{th}$ discharge as well as the cumulative capacity obtained in 25 and 50 cycles. The term cumulative capacity means the sum of all individual discharge capacities over the tested number of cycles. The given data represent the average of 4 cells per test in each group.

TABLE 2a

Additive composition for cathodes in Example 2

| Group# | Cathode Ah | g MnO2 | Anode Ah | Balance | BaSO4 | B8W | S8W | CaO | CoA | CaSt | Total |
|---|---|---|---|---|---|---|---|---|---|---|---|
| PriorArt1 | 2.43 | 7.88 | 2.31 | 95% | 5.00% | 0% | 0% | 0% | 0% | 0% | 5.00% |
| PriorArt2 | 2.43 | 7.88 | 2.31 | 95% | 5.00% | 0% | 0% | 1.00% | 0% | 0% | 6.00% |
| PriorArt3 | 2.36 | 7.66 | 2.31 | 98% | 7.15% | 0% | 0% | 0.25% | 0% | 0% | 7.40% |
| PriorArt4 | 2.19 | 7.10 | 2.31 | 106% | 15.00% | 0% | 0% | 0% | 0% | 0% | 15.00% |
| Test#6 | 2.27 | 7.36 | 2.31 | 102% | 0% | 1.00% | 6.50% | 0.25% | 0.15% | 0% | 7.90% |
| Test#7 | 2.26 | 7.34 | 2.31 | 102% | 0% | 1.00% | 6.75% | 0% | 0.15% | 0% | 7.90% |
| Test#8 | 2.27 | 7.37 | 2.31 | 102% | 0% | 9.50% | 0% | 0.25% | 0% | 0% | 9.75% |

Legend:
BaSO4 = barium sulfate;
B8W = barium hydrate (Ba(OH2)*8H2O);
S8W = strontium hydrate (Sr(OH2)*8H2O);
CaO = calcium oxide;
CoA = Coathylene ® HA1681
CaSt = calcium stearate (Ca[CH3(CH2)16CO2]2

TABLE 2b

Cycle performance over 50 deep discharge/charge cycles

| Grp# | Capacities in Ah | | | | | % Change vs. PriorArt1 | | | | |
|---|---|---|---|---|---|---|---|---|---|---|
| | cyc1 | cyc25 | cyc25cum | cyc50 | cyc50cum | cyc1 | cyc25 | cyc25cum | cyc50 | cyc50cum |
| PriorArt1 | 1.76 | 0.63 | 23.71 | 0.42 | 35.62 | 0% | 0% | 0% | 0% | 0% |
| PriorArt2 | 1.65 | 0.68 | 22.43 | 0.61 | 38.18 | −7% | 8% | −5% | 44% | 7% |
| PriorArt3 | 1.72 | 0.76 | 25.01 | 0.47 | 40.36 | −3% | 22% | 5% | 10% | 13% |
| PriorArt4 | 1.62 | 0.67 | 23.39 | 0.60 | 38.90 | −8% | 8% | −1% | 43% | 9% |
| Test#6 | 1.70 | 1.11 | 29.75 | 0.88 | 54.29 | −4% | 77% | 25% | 109% | 52% |
| Test#7 | 1.71 | 1.03 | 31.24 | 0.80 | 53.21 | −3% | 64% | 32% | 88% | 49% |
| Test#8 | 1.58 | 1.08 | 31.63 | 0.76 | 53.29 | −10% | 73% | 33% | 79% | 50% |

Legend:
cyc1 = Cycle1
cyc25 = Cycle25;
cyc50 = Cycle50;
cyc25cum = 25 CyclesCumulative;
cyc50cum = 50 CyclesCumulative As can be seen from Tables 2a and 2b, even though the additive level is increased, the cells of comparative test #6-8 still outperform the cells made according to prior art by a significant margin. Individual cycle 25 discharge capacity was up to 77% better than Prior Art 1 control and 55% better than best prior art. Cumulative over 25 cycles, total service capacity was up to 33% better than Prior Art 1 control and 28% better than best prior art. Individual cycle 50 discharge capacity was up to 109% better than Prior Art 1 control and 65% better than best prior art. Cumulative over 50 cycles, total service capacity was up to 52% better than Prior Art 1 control and 39% better than best prior art.

Example 3

Since all additive levels in example 1 and 2 showed improved performance over prior art, AA-size rechargeable alkaline cells were prepared and tested similar to example 1 except that the total additive range was further increased from 7.4% up to 20% as shown in Table 3a. In this test series, calcium stearate was used rather than Coathylene™ for improved cathode pellet pressing characteristics as described in U.S. Pat. Appl. No. 2005/0164076.

TABLE 3a

Additive composition for cathodes in Example 3

| Group# | Cathode Ah | g MnO2 | Anode Ah | Balance | BaSO4 | B8W | S8W | CaO | CoA | CaSt | Total |
|---|---|---|---|---|---|---|---|---|---|---|---|
| PriorArt1 | 2.43 | 7.88 | 2.31 | 95% | 5.00% | 0% | 0% | 0% | 0% | 0% | 5.00% |
| PriorArt2 | 2.43 | 7.88 | 2.31 | 95% | 5.00% | 0% | 0% | 1.00% | 0% | 0% | 6.00% |
| PriorArt3 | 2.36 | 7.66 | 2.31 | 98% | 7.15% | 0% | 0% | 0.25% | 0% | 0% | 7.40% |
| PriorArt4 | 2.19 | 7.10 | 2.31 | 106% | 15.00% | 0% | 0% | 0% | 0% | 0% | 15.00% |
| Test#9 | 2.28 | 7.39 | 2.31 | 101% | 0% | 1.00% | 6.00% | 0% | 0% | 0.40% | 7.40% |
| Test#10 | 2.25 | 7.31 | 2.31 | 103% | 0% | 1.00% | 6.50% | 0% | 0% | 0.40% | 7.90% |
| Test#11 | 2.16 | 7.01 | 2.31 | 107% | 0% | 1.00% | 8.35% | 0% | 0% | 0.40% | 9.75% |

TABLE 3a-continued

Additive composition for cathodes in Example 3

| Group# | Cathode Ah | g MnO2 | Anode Ah | Balance | BaSO4 | B8W | S8W | CaO | CoA | CaSt | Total |
|---|---|---|---|---|---|---|---|---|---|---|---|
| Test#12 | 2.04 | 6.62 | 2.31 | 113% | 0% | 1.00% | 10.85% | 0% | 0% | 0.40% | 12.25% |
| Test#13 | 2.04 | 6.61 | 2.31 | 114% | 0% | 0% | 11.85% | 0% | 0% | 0.40% | 12.25% |
| Test#14 | 1.92 | 6.22 | 2.31 | 121% | 0% | 1.00% | 13.60% | 0% | 0% | 0.40% | 15.00% |
| Test#15 | 1.81 | 5.87 | 2.31 | 128% | 0% | 1.00% | 16.10% | 0% | 0% | 0.40% | 17.50% |
| Test#16 | 1.71 | 5.54 | 2.31 | 135% | 0% | 1.00% | 18.60% | 0% | 0% | 0.40% | 20.00% |

Legend:
BaSO4 = barium sulfate;
B8W = barium hydrate (Ba(OH2)*8H2O);
S8W = strontium hydrate (Sr(OH2)*8H2O);
CaO = calcium oxide;
CoA = Coathylene ® HA1681;
CaSt = calcium stearate (Ca[CH3(CH2)16CO2]2

As can be seen from Table 3a, as the additive levels increase, the cathode capacity decreases accordingly while the anode capacity is kept constant. This results in an increased cell balance. Compared to prior art 1 cells, test #9 has 6% less capacity, test #10 has 7% less, test #11 has 11% less, test #12 & 13 have 16% less, test #14 has 21% less, test #15 has 26% less and test #16 has 30% less cathode capacity.

Table 3b shows the average discharge capacity of the test cells on the $1^{st}$, $25^{th}$ and $50^{th}$ discharge as well as the cumulative capacity obtained in 25 and 50 cycles. The term cumulative capacity means the sum of all individual discharge capacities over the tested number of cycles. The given data represent the average of 4 cells per test in each group.

As can be seen from Table 3b, the first cycle discharge capacity follows more or less the trend of theoretical cathode capacities. Lower theoretical cathode capacities result in lower first discharge capacities as well.

However, as the cycle numbers increase, the test groups with lower initial capacity catch up and provide increased performance. For example, compared to prior art 1 control test #14 showed 19% lower capacity in cycle 1, but already 22% better capacity in cycle 25 and was 57% better in cycle 50. Cumulative, this test #14 was still 7% lower than prior art 1 control over 25 cycles, but 13% better over 50 cycles. Given the fact that the capacities are achieved with about 20% less theoretical cathode capacity, the efficiency utilization of these cathodes is much better and the capacity fade much lower. This lower fade characteristic of the higher additive levels can be advantageously applied in cell designs, where high initial capacity is not required, but lower capacity fade preferred.

While the capacity fade characteristics are still very good for test #15 and #16 and cycle 50 capacity was better than prior art 1 control, over 50 cycles cumulative no advantage in total service capacity was found. Therefore, the upper limit for total additive was found at 17.5%.

Table 3c illustrates the lower capacity fade of the test groups with higher additive levels. The discharge capacities were converted in terms of capacity per each gram of active $MnO_2$ (Ah/gMnO2). This representation takes into account that the different test groups have different $MnO_2$ capacities, hence one can see that first cycle discharge capacity is more or less equivalent. However, as cycling progresses, the normalized capacity per unit gram of active $MnO_2$ of all test groups becomes much better than any prior art control.

TABLE 3b

Cycle performance over 50 deep discharge/charge cycles

| Grp# | Capacities in Ah | | | | | % Change vs. PriorArt1 | | | | |
|---|---|---|---|---|---|---|---|---|---|---|
| | cyc1 | cyc25 | cyc25cum | cyc50 | cyc50cum | cyc1 | cyc25 | cyc25cum | cyc50 | cyc50cum |
| PriorArt1 | 1.76 | 0.63 | 23.71 | 0.42 | 35.62 | 0% | 0% | 0% | 0% | 0% |
| PriorArt2 | 1.65 | 0.68 | 22.43 | 0.61 | 38.18 | −7% | 8% | −5% | 44% | 7% |
| PriorArt3 | 1.72 | 0.76 | 25.01 | 0.47 | 40.36 | −3% | 22% | 5% | 10% | 13% |
| PriorArt4 | 1.62 | 0.67 | 23.39 | 0.60 | 38.90 | −8% | 8% | −1% | 43% | 9% |
| Test#9 | 1.73 | 1.06 | 30.92 | 0.84 | 54.97 | −2% | 69% | 30% | 99% | 54% |
| Test#10 | 1.67 | 1.08 | 31.06 | 0.88 | 55.31 | −5% | 72% | 31% | 109% | 55% |
| Test#11 | 1.62 | 1.01 | 27.70 | 0.89 | 49.09 | −8% | 61% | 17% | 111% | 38% |
| Test#12 | 1.51 | 0.83 | 23.67 | 0.72 | 42.99 | −14% | 33% | 0% | 70% | 21% |
| Test#13 | 1.49 | 0.87 | 24.45 | 0.76 | 44.81 | −16% | 40% | 3% | 80% | 26% |
| Test#14 | 1.42 | 0.76 | 22.16 | 0.66 | 40.22 | −19% | 22% | −7% | 57% | 13% |
| Test#15 | 1.33 | 0.70 | 19.97 | 0.61 | 36.20 | −25% | 12% | −16% | 45% | 2% |
| Test#16 | 1.23 | 0.63 | 18.23 | 0.56 | 32.85 | −30% | 0% | −23% | 33% | −8% |

Legend:
cyc1 = Cycle1;
cyc25 = Cycle25;
cyc50 = Cycle50;
cyc25cum = 25 CyclesCumulative;
cyc50cum = 50 CyclesCumulative TABLE 3c Normalized cycle performance over 50 deep discharge/charge cycles

| Grp# | Capacities in Ah/gMnO2 | | | | | % Change vs. PriorArt1 | | | | |
|---|---|---|---|---|---|---|---|---|---|---|
| | cyc1 | cyc25 | cyc25cum | cyc50 | cyc50cum | cyc1 | cyc25 | cyc25cum | cyc50 | cyc50cum |
| PriorArt1 | 0.224 | 0.079 | 3.01 | 0.054 | 4.52 | 0% | 0% | 0% | 0% | 0% |
| PriorArt2 | 0.209 | 0.086 | 2.85 | 0.077 | 4.84 | −7% | 8% | −5% | 44% | 7% |
| PriorArt3 | 0.224 | 0.100 | 3.27 | 0.061 | 5.27 | 0% | 26% | 9% | 14% | 17% |
| PriorArt4 | 0.228 | 0.095 | 3.29 | 0.085 | 5.48 | 2% | 19% | 9% | 58% | 21% |
| Test#9 | 0.233 | 0.143 | 4.18 | 0.114 | 7.43 | 4% | 80% | 39% | 112% | 65% |
| Test#10 | 0.229 | 0.148 | 4.25 | 0.121 | 7.57 | 2% | 86% | 41% | 125% | 67% |
| Test#11 | 0.230 | 0.144 | 3.95 | 0.127 | 7.00 | 3% | 81% | 31% | 137% | 55% |
| Test#12 | 0.228 | 0.125 | 3.57 | 0.109 | 6.49 | 2% | 58% | 19% | 102% | 44% |
| Test#13 | 0.226 | 0.132 | 3.70 | 0.116 | 6.78 | 1% | 67% | 23% | 115% | 50% |
| Test#14 | 0.229 | 0.123 | 3.56 | 0.107 | 6.47 | 2% | 55% | 18% | 99% | 43% |
| Test#15 | 0.226 | 0.119 | 3.40 | 0.104 | 6.17 | 1% | 50% | 13% | 95% | 37% |
| Test#16 | 0.222 | 0.114 | 3.29 | 0.101 | 5.93 | −1% | 43% | 9% | 89% | 31% |

Legend:
cyc1 = Cycle1;
cyc25 = Cycle25;
cyc50 = Cycle50;
cyc25cum = 25 CyclesCumulative;
cyc50cum = 50 CyclesCumulative Test #12 and #13 cathode compare strontium, barium, calcium compound mix with a strontium, calcium compound mix containing no barium compound at a 12.25% total additive level. At this high additive level, the test #13 without barium in the formulation showed better performance over 50 cycles than test #14 with the barium compound. This shows that at high levels of additives, no additional barium compound is needed for best performance.

Although table 3c illustrates very clearly that all formulations of tests #9 through #16 exhibit much improved efficiency on a specific $MnO_2$ mass basis, starting at total additive levels of 20% the absolute capacity values (provided in Table 3b) are lower than the best prior art formulations. Further additive addition therefore provides no practical benefit beyond this point.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense. Variations of the foregoing embodiments will be evident to a person of ordinary skill and are intended by the inventor to be encompassed by the following claims.

The invention claimed is:

1. A rechargeable electrochemical cell comprising:
   a manganese dioxide cathode,
   a separator,
   an anode, and
   an aqueous alkaline electrolyte,
   wherein the cathode comprises:
   (i) a strontium compound consisting of strontium oxide, strontium hydroxide, or hydrates thereof, in an amount of from 4.50 to 16.10% by weight of the cathode, and
   (ii) a barium compound consisting of hydrates of barium hydroxide present in a non-zero amount of less than 1.0% by weight of the cathode,
   wherein the cell has an individual discharge capacity after 50 deep discharge-charge cycles, to 1.75 V, of at least 0.100 Ah/gMnO$_2$, and
   wherein the cell has a cumulative discharge capacity after 50 deep discharge-charge cycles, to 1.75 V, of at least 6.17 Ah/gMnO$_2$.

2. The electrochemical cell according to claim 1, wherein the cathode further comprises a calcium compound selected from the group consisting of calcium oxide, calcium hydroxide, and calcium stearate.

3. The electrochemical cell according to claim 1, wherein the strontium compound is present in an amount of from 5.75 to 11.85% by weight of the cathode.

4. The electrochemical cell according to claim 2, wherein the calcium compound (i) comprises is calcium oxide present in an amount of from 0.1 to 0.5% by weight of the cathode and (ii) is accompanied by a polyethylene compound in an amount of from 0.1 to 0.2% by weight of the cathode.

5. The electrochemical cell according to claim 2, wherein the calcium compound is present in an amount of from 0.25 to 1.25% by weight of the cathode.

6. The electrochemical cell according to claim 5, wherein the calcium compound comprises calcium stearate and is present in an amount of from 0.25 to 0.5% by weight of the cathode.

7. The electrochemical cell according to claim 1, wherein the cell has an individual discharge capacity after 50 deep discharge-charge cycles, to 1.75 V, of at least 0.104 Ah/gMnO$_2$.

8. The electrochemical cell according to claim 7, wherein the cell has an individual discharge capacity after 50 deep discharge-charge cycles, to 1.75 V, of at least 0.114 Ah/gMnO$_2$.

9. The electrochemical cell according to claim 8, wherein the cell has an individual discharge capacity after 50 deep discharge-charge cycles, to 1.75 V, of at least 0.121 Ah/gMnO$_2$.

10. The electrochemical cell according to claim 1, wherein the cathode further comprises a hydrogen recombination catalyst consisting of a silver, silver oxide, group I compound of silver, or metal hydride, in an amount of from 0.1 to 5%.

* * * * *